(12) United States Patent
Chae et al.

(10) Patent No.: US 8,027,007 B2
(45) Date of Patent: Sep. 27, 2011

(54) THIN FILM TRANSISTOR HAVING A COPPER SIGNAL LINE AND METHOD OF MANUFACTURING THE SAME

(75) Inventors: Gee-Sung Chae, Incheon (KR); Gyoo-Chul Jo, Gyeoenggi-do (KR); Yong-Sup Hwang, Gyeoenggi-do (KR)

(73) Assignee: LG Display Co., Ltd., Seoul (KR)

( * ) Notice: Subject to any disclaimer, the term of this patent is extended or adjusted under 35 U.S.C. 154(b) by 1241 days.

(21) Appl. No.: 10/705,914

(22) Filed: Nov. 13, 2003

(65) Prior Publication Data
US 2004/0125257 A1 Jul. 1, 2004

(30) Foreign Application Priority Data
Dec. 31, 2002 (KR) .................. 10-2002-0088412

(51) Int. Cl.
*G02F 1/136* (2006.01)
*G02F 1/1343* (2006.01)
(52) U.S. Cl. ............. 349/147; 349/43; 349/46; 349/148
(58) Field of Classification Search .................... 349/43, 349/46, 147, 148
See application file for complete search history.

(56) References Cited

U.S. PATENT DOCUMENTS

| 6,091,466 A * | 7/2000 | Kim et al. ........................ 349/43 |
| 6,219,125 B1 * | 4/2001 | Ishikura et al. ............... 349/147 |
| 6,252,247 B1 * | 6/2001 | Sakata et al. .................... 257/57 |
| 6,432,755 B2 * | 8/2002 | Sung et al. ..................... 438/158 |
| 6,881,679 B2 * | 4/2005 | Jo et al. ......................... 438/745 |
| 2001/0029054 A1 * | 10/2001 | Maeda et al. ................... 438/17 |
| 2003/0127649 A1 * | 7/2003 | Chae .............................. 257/72 |

FOREIGN PATENT DOCUMENTS

| JP | 05-226332 | 9/1993 |
| JP | 6-260645 | 9/1994 |
| JP | 10-133597 | 5/1998 |
| JP | 2000-165002 | 6/2000 |
| KR | 1020000056517 | 9/2000 |
| KR | 1020020074302 | 9/2002 |

* cited by examiner

*Primary Examiner* — Lauren Nguyen
(74) *Attorney, Agent, or Firm* — McKenna Long & Aldridge LLP

(57) ABSTRACT

An array substrate for a liquid crystal display device includes a substrate, a thin film transistor having a signal line of dual layered structure of a copper compound and copper, and a pixel electrode connected to the thin film transistor.

5 Claims, 7 Drawing Sheets

THIN FILM TRANSISTOR HAVING A COPPER SIGNAL LINE AND METHOD OF MANUFACTURING THE SAME

This application claims the benefit of Korean Patent Application No. 2002-88412, filed on Dec. 31, 2002, which is hereby incorporated by reference for all purposes as if fully set forth herein.

BACKGROUND OF THE INVENTION

1. Field of the Invention

The present invention relates to a thin film transistor for a liquid crystal display (LCD) device and more particularly, to a thin film transistor having a metal signal line for a liquid crystal display device and a manufacturing method thereof.

2. Discussion of the Related Art

Generally, a liquid crystal display (LCD) device includes two substrates that are spaced apart and face each other with a liquid crystal material layer interposed between the two substrates. Each of the substrates includes electrodes that face each other, wherein a voltage applied to each electrode induces an electric field between the electrodes and within the liquid crystal material layer. The intensity and direction of the applied electric field affects alignment of liquid crystal molecules of the liquid crystal material layer. Accordingly, the LCD device displays an image by varying light transmissivity through the liquid crystal material layer in accordance with the arrangement of the liquid crystal molecules.

FIG. 1 is an enlarged perspective view of a liquid crystal display (LCD) device according to the related art. In FIG. 1, an LCD device 11 has upper and lower substrates 5 and 22, which are spaced apart from and facing each other, and a liquid crystal material layer 14 interposed between the upper and lower substrates 5 and 22. The upper substrate 5 includes a black matrix 6, a color filter layer 8, and a transparent common electrode 18 subsequently disposed on an interior surface thereof. The black matrix 6 includes openings having one of three sub-color filters of red (R), green (G), and blue (B).

A gate line 13 and a data line 15 are formed on an interior surface of the lower substrate 22, which is commonly referred to as an array substrate, such that the gate line 13 and the date line 15 cross each other to define a pixel area P. In addition, a thin film transistor T is formed at the crossing of the gate line 13 and the data line 15 and includes a gate electrode, a source electrode, and a drain electrode. A pixel electrode 17 is formed within the pixel area P to correspond to the sub-color filters (R), (G), and (B) and is electrically connected to the thin film transistor T. The pixel electrode 17 is made of a light transparent conductive material, such as indium-tin-oxide (ITO).

A storage capacitor C is connected to the pixel electrode 17. The gate line 13 acts as a first capacitor electrode and a metal layer 30 acts as a second capacitor electrode that is connected to the pixel electrode 17. The metal layer 30 is formed when source and drain electrodes for the thin film transistor T are formed.

A scanning pulse is supplied to the gate electrode of the thin film transistor T along the gate line 13, and a data signal is supplied to the source electrode of the thin film transistor T along the data line 15. Accordingly, light transmission through the liquid crystal material layer 14 is adjusted by controlling electrical and optical properties of the liquid crystal material layer 14. For example, the liquid crystal material layer 14 includes a dielectric anisotropic material having spontaneous polarization properties such that the liquid crystal molecules form a dipole when the electric field is induced. Thus, the liquid crystal molecules of the liquid crystal material layer 14 are controlled by the applied electric field. In addition, optical modulation of the liquid crystal material layer 14 is adjusted according to the arrangement of the liquid crystal molecules. Therefore, images on the LCD device are produced by controlling the light transmittance of the liquid crystal material layer 14 due to optical modulation of the liquid crystal material layer 14.

Detailed description of the pixel area P is explained with reference to FIG. 2, which is an enlarged plan view of an array substrate for an LCD device according to the related art. Gate lines 62 and data lines 76 are formed on a substrate 50 to cross each other, thereby defining pixel areas P.

A thin film transistor T is formed at the crossing of each of the gate and data lines 62 and 76 to function as a switching element. The thin film transistor T includes a gate electrode 60 that is connected to the gate line 62 to receive scanning signals, a source electrode 70 is connected to the data line 76 and receives data signals, and a drain electrode 72 is spaced apart from the source electrode 70. In addition, the thin film transistor T includes an active layer 66 between the gate electrode 13 and the source and drain electrodes 70 and 72, and a transparent pixel electrode 80 is formed in the pixel area P and is connected to the drain electrode 72. The pixel electrode 80 is connected to a metal layer 74 and forms a storage capacitor C.

To prevent signal delay on the gate line 62, a low resistance metal, for example aluminum Al or aluminum alloy AlNd, is used as a gate line 62. Because aluminum is chemically weak, chrome Cr or molybdenum Mo is used as a protection layer. Thus, the gate line 62 is formed as a dual layer.

Because there is a difference in etching ratio for the two layers using the same etchant, it is difficult to pattern the dual layered gate line, which will be explained with reference to FIGS. 3A to 3F.

As shown in FIG. 3A, an aluminum material and a molybdenum material are sequentially deposited on a substrate 50, where switching and pixel areas T and P are defined, thereby forming a first metal layer 52 and a second metal layer 54. A photo-resister layer is deposited on the second metal layer 54 and patterned to form a PR pattern 56.

When the exposed portion of the second metal layer 54 and the first metal layer 52 are etched by an etchant, only metal portions 58a and 58b under the PR pattern 56 remain, as shown in FIG. 3B. When a wet etching process is carried out, overhangs are formed because Mo shows a lower etching rate than Al. This overhang causes, during subsequent formation of an insulation film on the signal layer, deterioration of insulation performance of the insulation film by the formation of voids or cavities on the sides of the layer of Al material underlying it To solve the overhang problem, a dry etching to etch peripheral portions of the second metal portion 58b and the PR pattern 56 is carried out, and the step caused by the overhang becomes smooth as shown in FIG. 3C.

The PR pattern 56 is then removed to expose a gate electrode 60 of Al/Mo in the switching area T and a gate line 62 near the peripherals of the pixel area P as shown in FIG. 3D. Sequentially, on the gate electrode 60 and the gate line 62 a gate insulating layer 64 is formed. The gate insulating layer 64 may be selected from non-organic materials, for example silicon nitride or silicon oxide.

Next, on the gate insulating layer 64, an amorphous silicon layer and a doped amorphous silicon layer are formed and patterned into an active layer 66 and an ohmic contact layer 68, respectively, as shown in FIG. 3E.

After forming the ohmic contact layer 68, a conducting metal such as aluminum Al, aluminum alloy, tungsten W, molybdenum Mo or chrome Cr is deposited and patterned to form source and drain electrodes 70 and 72 contacting the ohmic contact layer 68 and spaced apart from each other. A data line 76 connected to the source electrode 70 is also formed. At the same time, an island-shaped metal layer 74 for a capacitor is formed over the gate line 62.

Next, as shown in FIG. 3F, a passivation layer 78 is formed entirely on the substrate 50 by coating organic material, for example benzocyclobutene (BCB) and an acrylic resin, or by depositing an inorganic material, for example silicon nitride (SiNx) and silicon oxide ($SiO_2$). The passivation layer 78 is patterned to expose portions of the drain electrode 72 and the island shaped metal layer 74.

Next, a pixel electrode 80 is formed on the passivation layer 78 by depositing a transparent conductive material, for example indium-tin-oxide (ITO) and indium-zinc-oxide (IZO), and patterning the transparent conductive material. The pixel electrode 80 is connected to the drain electrode 72 and the island-shaped metal layer 74 via the exposed portions of the drain electrode 72 and the island shaped metal layer 74, respectively.

An array substrate may be manufactured as explained above, but when forming the gate line and the gate electrode, both wet etching and dry etching should be carried out to overcome the overhang problem. Accordingly, the total manufacturing time increases.

SUMMARY OF THE INVENTION

Accordingly, the present invention is directed to an array substrate for a liquid crystal display device and a manufacturing method thereof that substantially obviates one or more problems due to limitations and disadvantages of the related art.

An advantage of the present invention is to provide an array substrate for a liquid crystal display device and a manufacturing method thereof that shortens manufacturing time.

Another advantage of the present invention is to provide an array substrate for a liquid crystal display device and a manufacturing method thereof that provides a signal line having a low resistance for a large sized display device.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for a liquid crystal display device includes a substrate, a thin film transistor having a signal line of dual layered structure of a copper compound and copper, and a pixel electrode connected to the thin film transistor.

In another aspect of the present invention, a manufacturing method of an array substrate for a liquid crystal display device includes forming a copper compound layer on a substrate, forming a copper layer on the copper compund layer, forming a signal line by etching the copper compound layer and the copper layer, forming a thin film transistor having the signal line, and forming a pixel electrode connected to the thin film transistor.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to the illustrated embodiment of the present invention, which is illustrated in the accompanying drawings.

Figure 1:
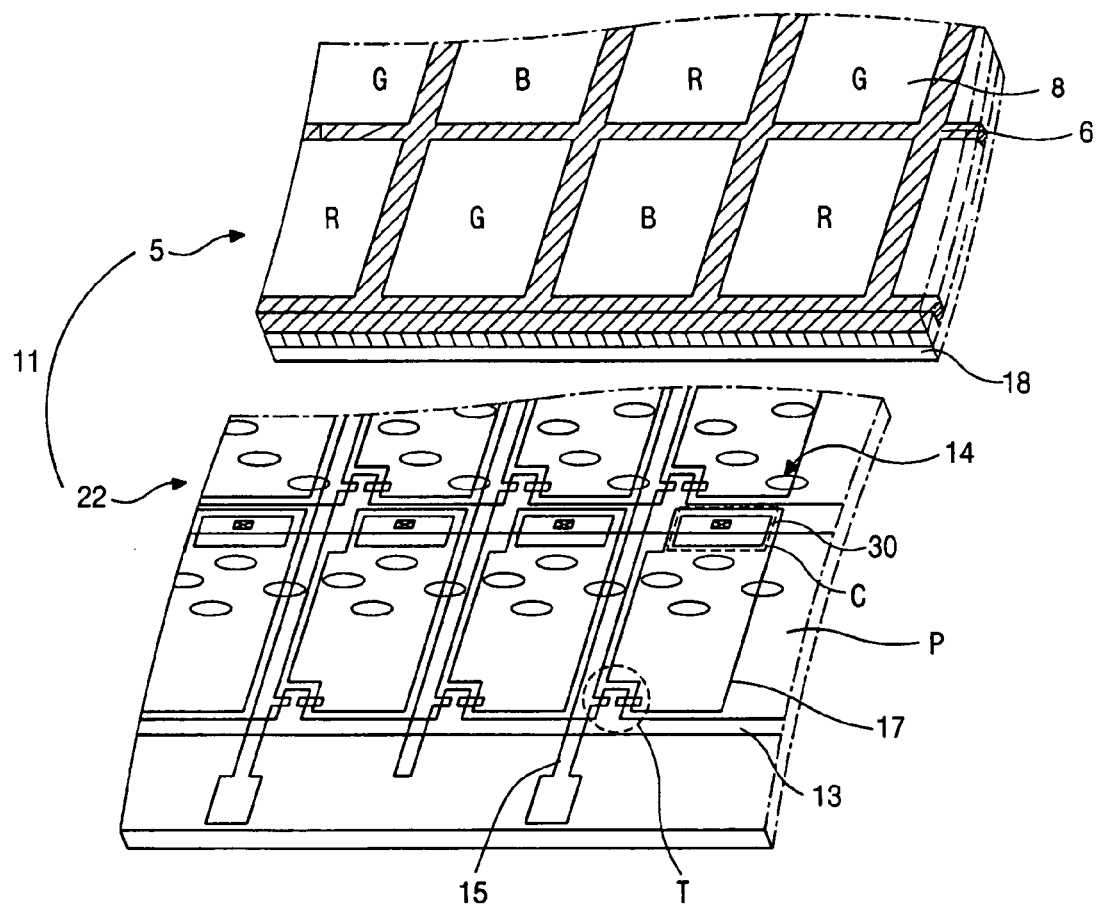
FIG. 1 is an enlarged perspective view of a liquid crystal display (LCD) device according to the related art.
Figure 2:
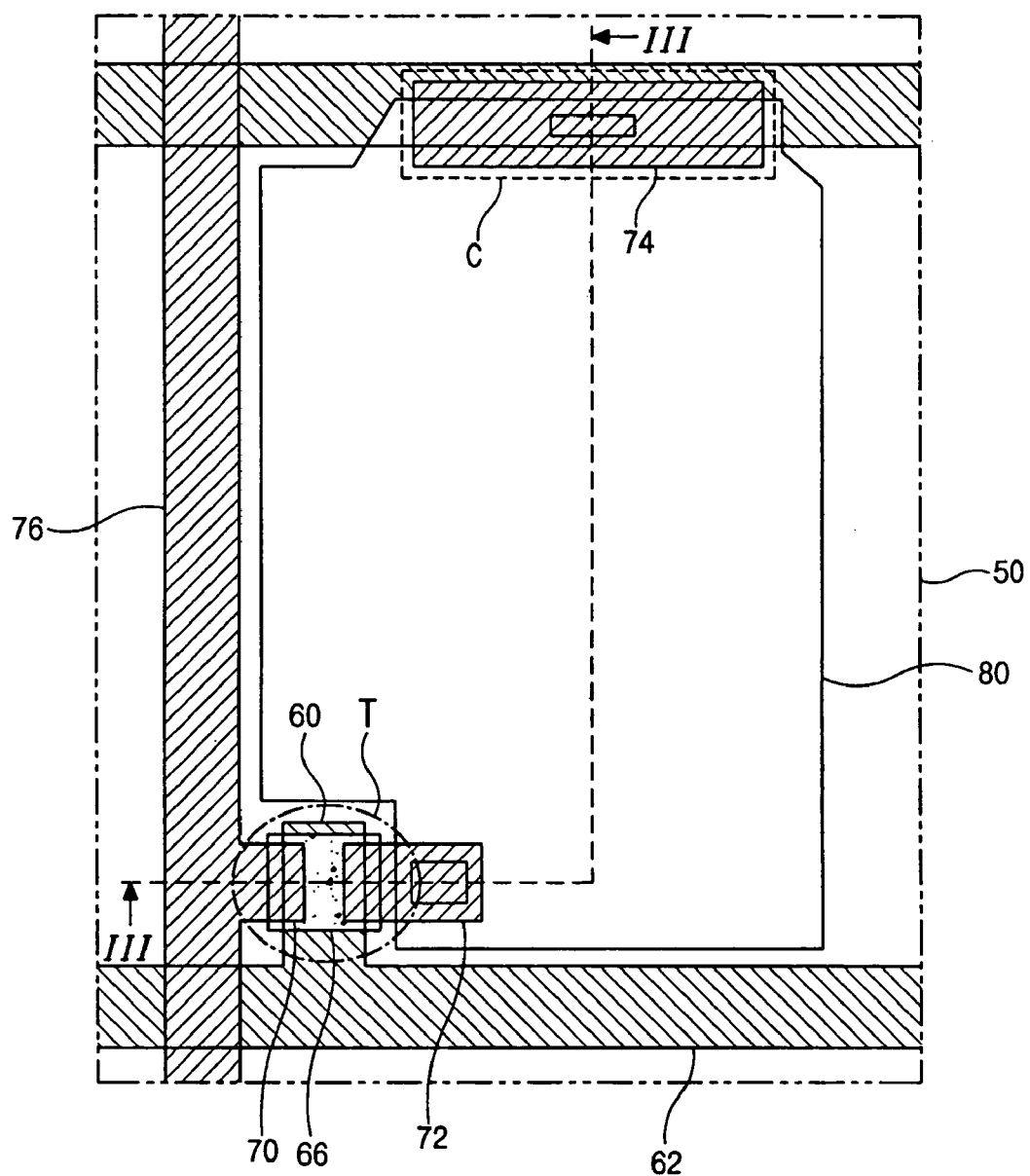
FIG. 2 is an enlarged plan view of an array substrate for an LCD device according to the related art.
Figure 3A:
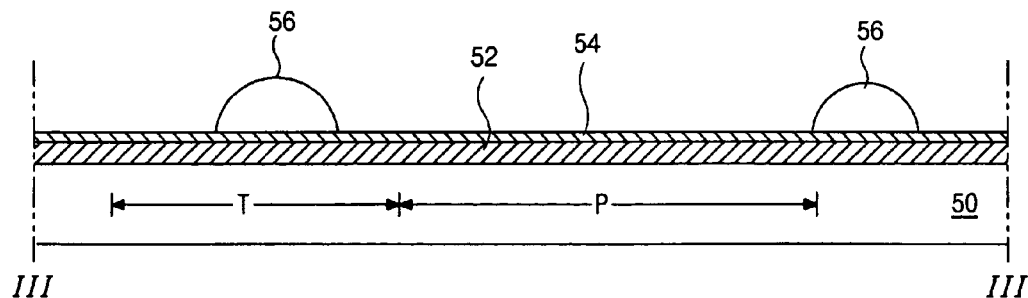
FIGS. 3A to 3F are cross sectional views of a manufacturing method of the array substrate along III-III of FIG. 1 according to the related art.
Figure 3B:
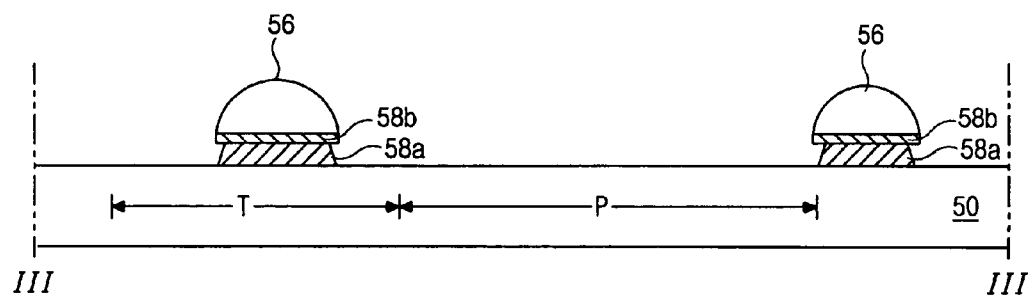
Figure 3C:
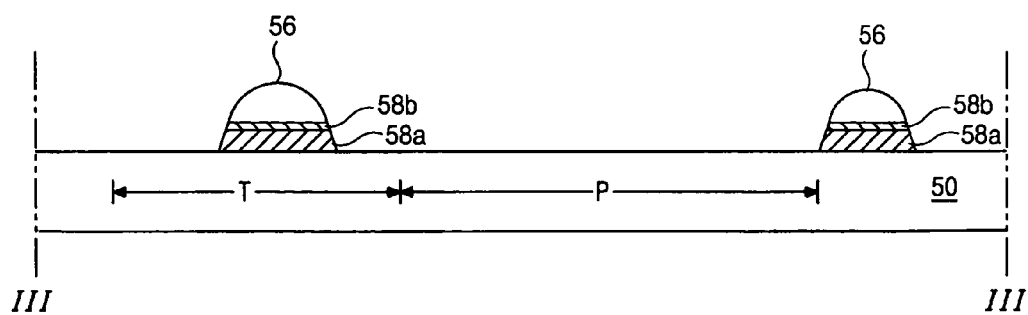
Figure 3D:
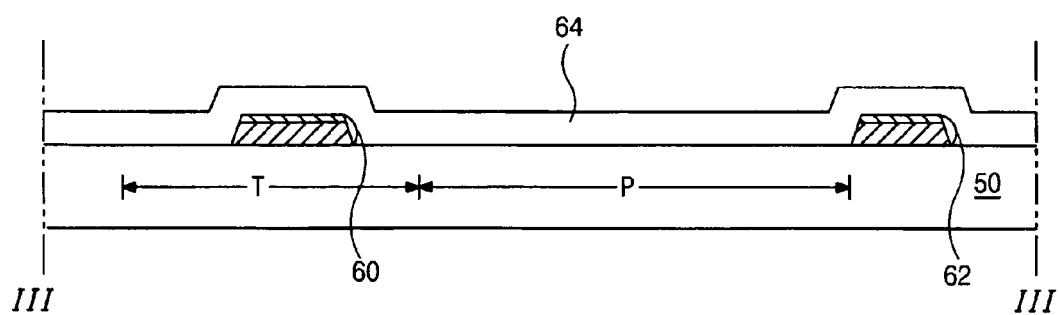
Figure 3E:
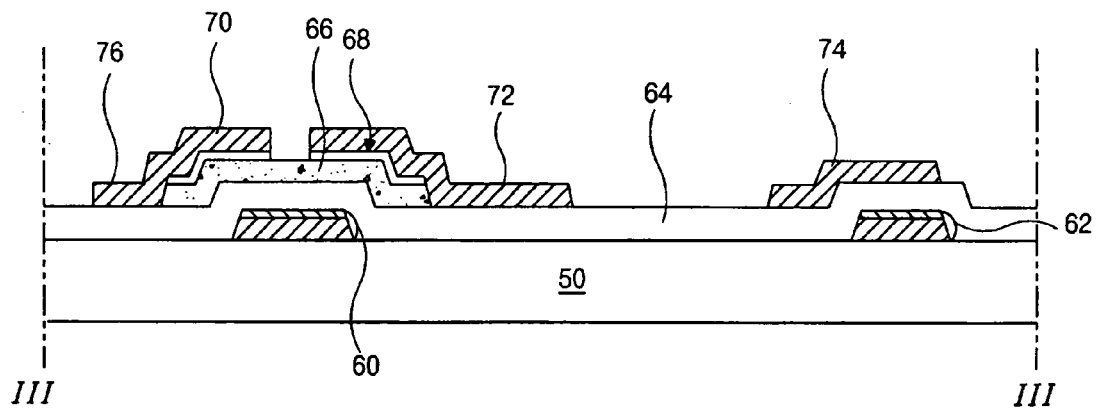
Figure 3F:
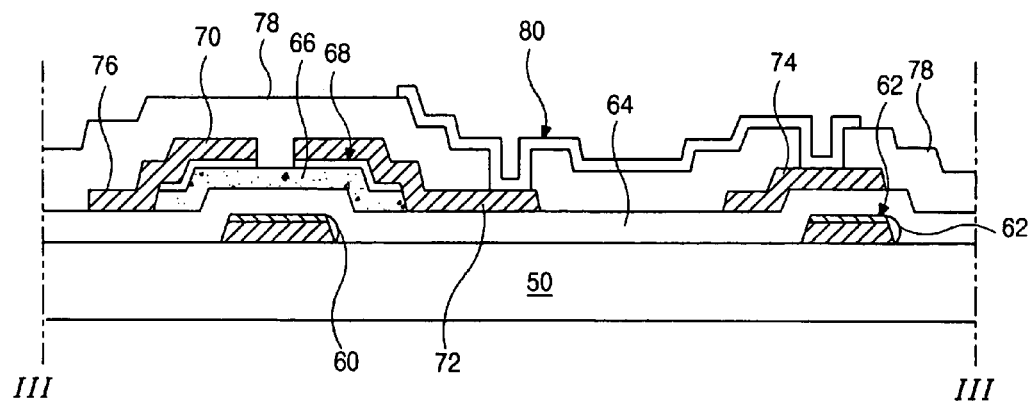

FIGS. 4A to 4E are cross sectional views of a manufacturing method of the array substrate along III-III of FIG. 1 according to an embodiment of the present invention. Because the plan view of the array substrate is substantially similar to FIG. 2, the manufacturing method and the material used for the array substrate will be explained and the reference numerals are similar to those in FIG. 2.

Figure 4A:
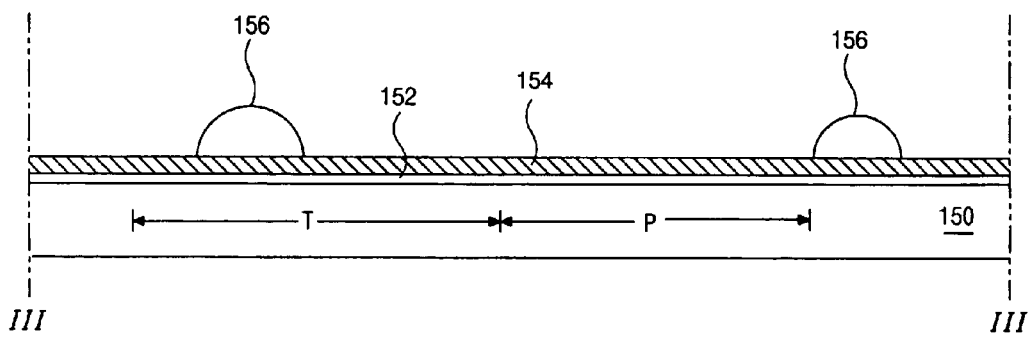
FIGS. 4A to 4E are cross sectional views of a manufacturing method of the array substrate according to the present invention.

First, a switching area T and a pixel area P are defined on a substrate 150. As shown in FIG. 4A, on the substrate 150, copper is deposited by a sputtering method in the presence of a reactive gas flow, for example ammonium gas $NH_3$ or nitrogen gas $N_2$, in a processing chamber to be combined with the copper. Thus, on the substrate 150 a copper compound ($Cu_xN$) layer 152 is formed. The copper compound has substantially the same etching ratio as copper and does not react on the copper by an etchant. The adhesion of the copper compound to the substrate is better than that of copper.

Next, on the copper compound layer 152, copper is again deposited by a sputtering method in the presence of an inert gas, for example Ar, in the processing chamber to form a copper layer 154.

A photoresist layer is formed on the copper layer 154 and patterned into PR patterns 156. The PR patterns 156 are for a gate line and a gate electrode, as explained with reference to FIG. 2.

Figure 4B:
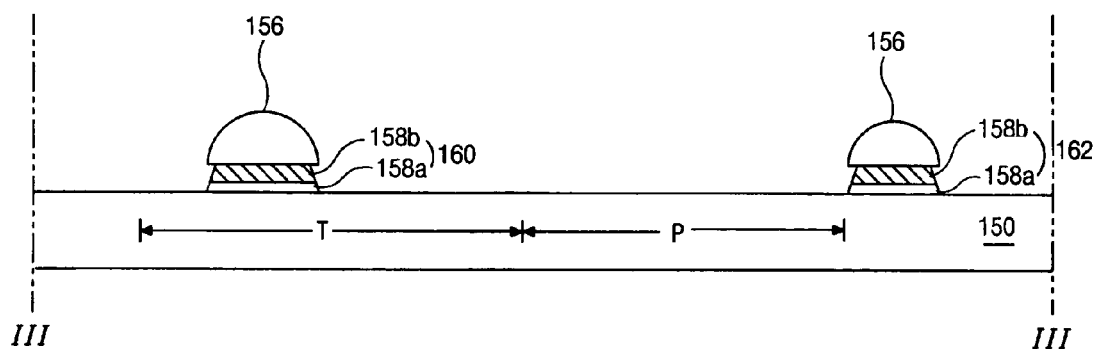

After forming PR patterns 156, a wet etching is carried out to etch a copper compound portion 158a and copper portion 158b to form a gate line 162 and a gate electrode 160, as shown in FIG. 4B. There is no step or overhang configuration between the copper compound portion 158a and copper portion 158b, because the etching ratios of the two materials are substantially the same. The copper compound portion 158a helps to increase adhesion between the copper portion 158b and the substrate 150.

Sequentially, on the gate electrode 160 and the gate line 162 a gate insulating layer 164 is formed. The gate insulating layer 164 may be selected from among non-organic materials such as silicon nitride or silicon oxide.

Figure 4C:
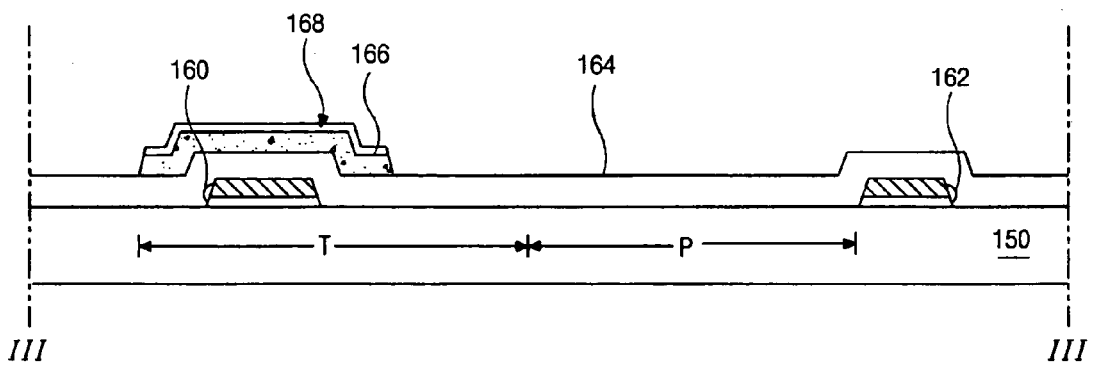

Next, on the gate insulating layer 164, an amorphous silicon layer and a doped amorphous silicon layer are formed and patterned into an active layer 166 and an ohmic contact layer 168, respectively, as shown in FIG. 4C.

Figure 4D:
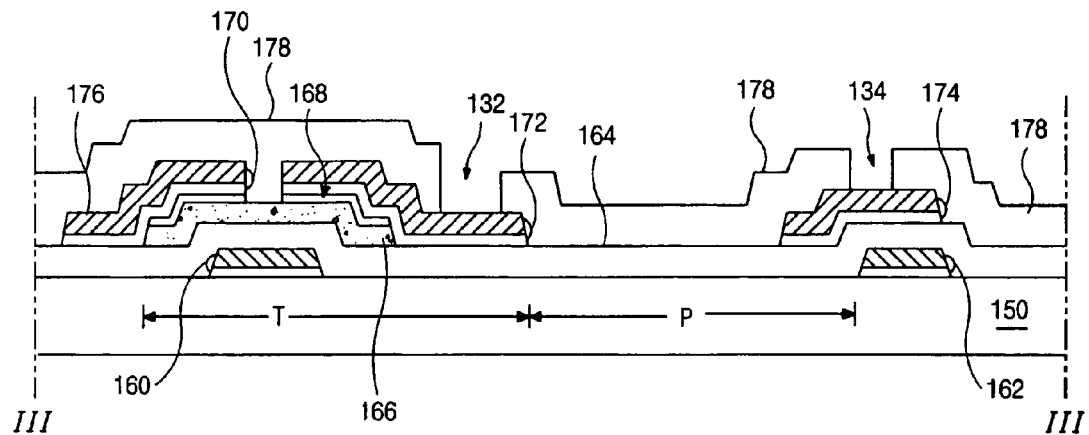
Figure 4E:
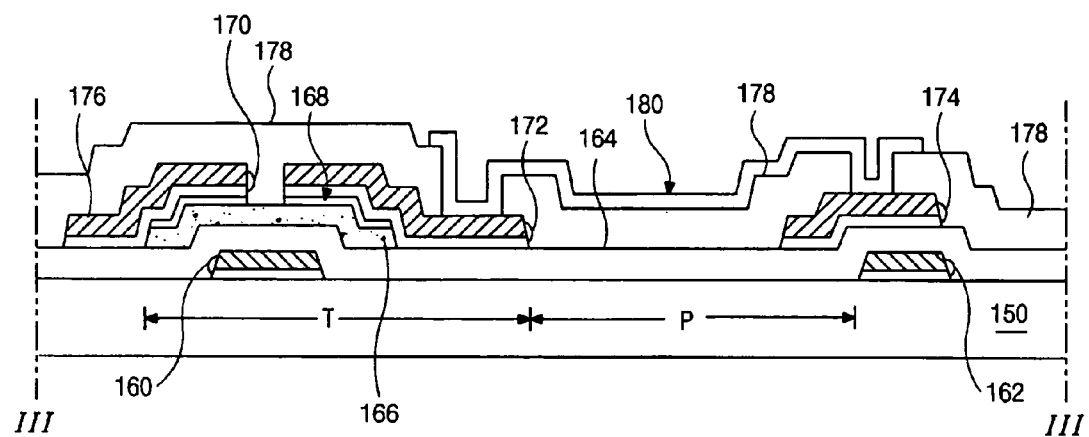

In FIG. 4D, after forming the ohmic contact layer 168, a copper compound layer and a copper layer are formed and patterned to form source and drain electrodes 170 and 172 contacting the ohmic contact layer 168 and spaced apart from each other. A data line 176 connected to the source electrode 170 is also formed. At the same time, an island-shaped metal layer 174 for a capacitor is formed over the gate line 162. The deposition method of the copper compound layer and the copper layer is the same as explained above. Thus, the source and drain electrodes 170 and 172, the data line 176, and the island-shaped metal layer 174 are dual layers. The copper compound layer helps to prevent a chemical reaction between the copper layer and the silicon component of the ohmic contact layer 168.

Next, as shown in FIG. 4D, a passivation layer 178 may be formed entirely on the substrate 150 by coating organic material, for example benzocyclobutene (BCB) and an acrylic resin, or by depositing an inorganic material, for example silicon nitride (SiNx) and silicon oxide ($SiO_2$). The passivation layer 178 is patterned to expose portions of the drain electrode 172 and the island shaped metal layer 174 to form a drain contact hole 132 and a capacitor contact hole 134, respectively.

Next, a pixel electrode 180 is formed on the passivation layer 178 by depositing a transparent conductive material, for example indium-tin-oxide (ITO) and indium-zinc-oxide (IZO), and patterning the transparent conductive material. The pixel electrode 180 is connected to the drain electrode 172 and the island-shaped metal layer via the drain contact hole 132 and the capacitor contact hole 134, respectively.

In the present invention, though the signal lines including gate line 162 and data line 176 are dual layers, the etching step may be shortened, because there is no overhang problem. Because copper has lower resistance than aluminum, the signal delay problem in a large sized display may be overcome. Further, copper is chemically stronger against corrosion than aluminum. Accordingly, fabricating time and costs are reduced, and productivity and characteristic of the liquid crystal display device increases.

It will be apparent to those skilled in the art that various modifications and variations may be made in the present invention without departing from the spirit or scope of the invention. Thus, it is intended that the present invention cover the modifications and variations of this invention provided they come within the scope of the appended claims and their equivalents.

What is claimed is:

1. A manufacturing method of an array substrate for a liquid crystal display device, comprising:

forming a first copper compound layer including nitrogen directly on a substrate;

forming a first copper layer directly on the first copper compound layer after forming the first copper compound layer including nitrogen;

forming a gate line and a gate electrode by etching the first copper compound layer and the first copper layer, wherein a top surface of the first copper layer has a narrower width than a top surface of the first copper compound layer and the first copper layer is thicker than the first copper compound layer;

forming a gate insulating layer on the gate line and the gate electrode;

forming a forming an active layer on the gate insulating layer over the gate electrode;

forming an ohmic contact layer the active layer;

forming a second copper compound layer including nitrogen and directly on the ohmic contact layer;

forming a second copper layer on the second copper compound layer directly on the ohmic contact layer after forming the second copper compound layer including nitrogen;

forming a data line, a source electrode, a drain electrode and an island-shaped metal layer by etching the second copper compound layer and the second copper layer on the ohmic contact layer, wherein the data line crosses the gate line, the source and drain electrodes over the gate electrode, and the island-shaped metal layer is disposed directly over the gate line;

forming a passivation layer on the data line, the source electrode, the drain electrode and the island-shaped metal layer, the passivation layer having a first contact hole exposing the drain electrode and a second contact hole exposing the island-shaped metal layer; and forming a pixel electrode on the passivation layer, the pixel electrode connected to the drain electrode through the first contact hole and connected to the island-shaped metal layer through the second contact hole, wherein the first copper compound layer is disposed between the first copper layer and the substrate to increase adhesion between the first copper layer and the substrate, and the second copper compound layer is disposed between the second copper layer and the ohmic contact layer to prevent a chemical reaction between the second copper layer and the silicon component of the ohmic contact layer.

2. The method according to claim 1, wherein the first and second copper compound layers are formed in a processing chamber where a gas flows that chemically combines with the copper.

3. The method according to claim 2, wherein the gas is one of $NH_3$ and $N_2$.

4. The method according to claim 1, wherein the first and second copper layers are formed in a processing chamber where a gas flows that does not chemically combine with the copper.

5. The method according to claim 4, wherein the gas is Ar.

* * * * *